Figure 1:
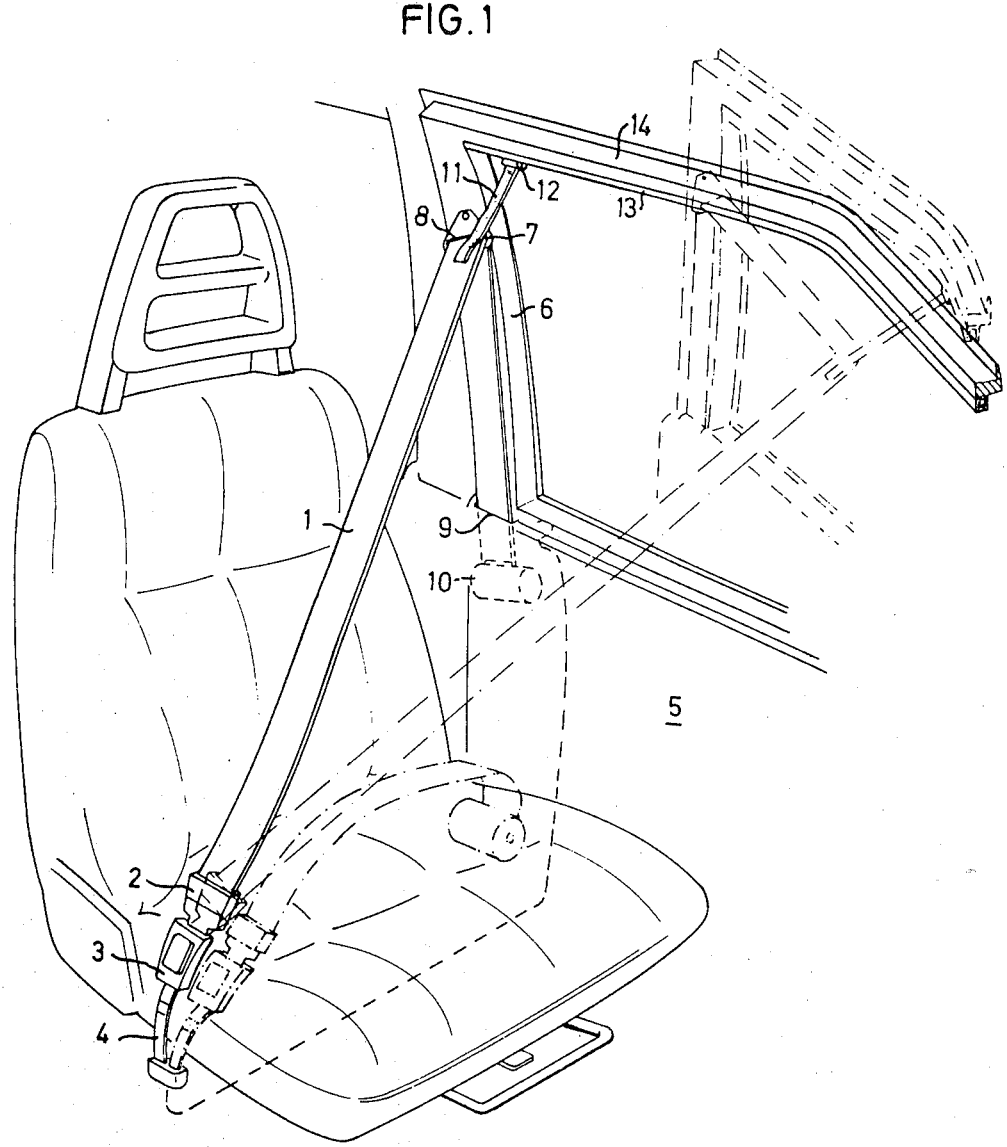

United States Patent [19]

Schultz et al.

[11] 4,336,957
[45] Jun. 29, 1982

[54] PASSIVE SAFETY BELT SYSTEM FOR MOTOR VEHICLES

[75] Inventors: Bengt I. Schultz, Göteborg; Göran Svensson, Alingsas, both of Sweden

[73] Assignee: AB Volvo, Göteborg, Sweden

[21] Appl. No.: 197,537

[22] Filed: Oct. 16, 1980

[30] Foreign Application Priority Data

Oct. 23, 1979 [SE] Sweden ................. 7908767

[51] Int. Cl.³ .............................................. B60R 21/10
[52] U.S. Cl. .................................... 280/803; 280/804; 280/808
[58] Field of Search ............... 280/803, 804, 807, 808, 280/806

[56] References Cited

U.S. PATENT DOCUMENTS 4,029,339 6/1977 Kaneko et al.
4,181,326 1/1980 Hollowell et al. ................. 280/806
4,225,156 9/1980 Barnett ................. 280/804

FOREIGN PATENT DOCUMENTS 360044 9/1973 Sweden.

Primary Examiner—Joseph F. Peters, Jr.
Assistant Examiner—John A. Carroll
Attorney, Agent, or Firm—Young & Thompson

[57] ABSTRACT

The invention relates to a passive safety belt system for motor vehicles. The belt extends from a point of attachment at the floor of the vehicle via a redirecting fitting attached to the door, to a reel mechanism arranged in the door. In the vicinity of the fitting, a strap is attached to the belt. The outer end of the strap is provided with a block which runs in a track on the upper door window frame. When the door is opened, the block is displaced automatically forward in the track, whereby the strap pulls forward the upper end of the active diagonal portion of the belt, so that it is moved away from the seat.

4 Claims, 6 Drawing Figures

PASSIVE SAFETY BELT SYSTEM FOR MOTOR VEHICLES

The present invention relates to a passive safety belt system for motor vehicles, comprising a belt band which has an active portion extending diagonally across the vehicle seat from a lower point of attachment at or in the vicinity of the floor of the vehicle, via a redirecting fitting which is attached at the rear portion of the door window frame of the door adjacent to the seat, to the reel mechanism arranged in the door.

Among the known passive belt systems, it is possible to distinguish two basic types. In one type the upper point of the diagonal band is displaced forward as the door opens in a guide above the door by means of a drive mechanism which can comprise an electric motor or a manually driven gear mechanism. The advantage of this type of belt system is that the band is moved far enough out of the way, that it does not appreciably obstruct getting in and out of the vehicle. A substantial disadvantage is, however, that most of these systems are expensive, complicated and unreliable. One example of this type of belt system is revealed in German Offenlegungsschrift No. 2 552 862. The other principal type is characterized by the upper point of the diagonal belt band being fixed in the door in the vicinity of the upper rear corner of the door. This simplifies the design considerably in comparison with the first-mentioned type, but in return the belt constitutes an obstacle to getting in and out of the vehicle to a much higher degree. This is especially true when the door cannot be fully opened. An example of this latter type is revealed in U.S. Patent Specification No. 4,007,802.

The purpose of the present invention is to achieve a belt system of the type described in the introduction which improves the comfort in getting in and out of the vehicle using the last-mentioned belt type without requiring the complicated arrangement characterizing the first-mentioned type.

This is achieved according to the invention by the belt band being joined, in the vicinity of the redirecting fitting, to one end of a strap, the other end of which is provided with a cursor, which can be moved in a track which extends along the upper part of the door window frame, such that, when the opening angle of the door increases, the belt band loads, via the strap, the cursor with a forwardly directed force component, which displaces the cursor towards the front end of the track.

When the door is opened and the band is reeled out from the reel mechanism in the door, the band will not, as in previously known designs of the type in question, extend along a straight line between the redirecting fitting and the lower fitting on the inner side of the seat. As the angle between the door and the longitudinal direction of the vehicle increases, the cursor will automatically be moved forward in the track, which results in the strap pulling the upper end of the active diagonal portion of the band forward along the door. This portion of the band is thus moved away from the seat to a substantially higher degree than when the band extends straight from the redirecting fitting to the lower point of attachment.

Figure 2:
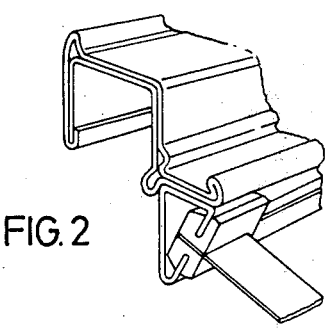
Figure 3:
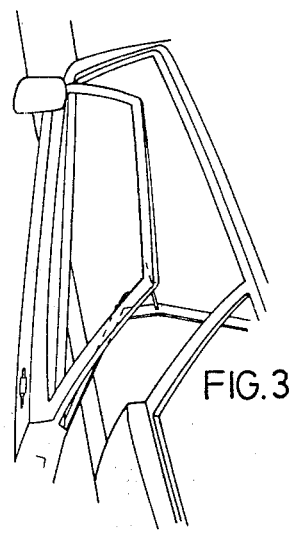
Figure 4:
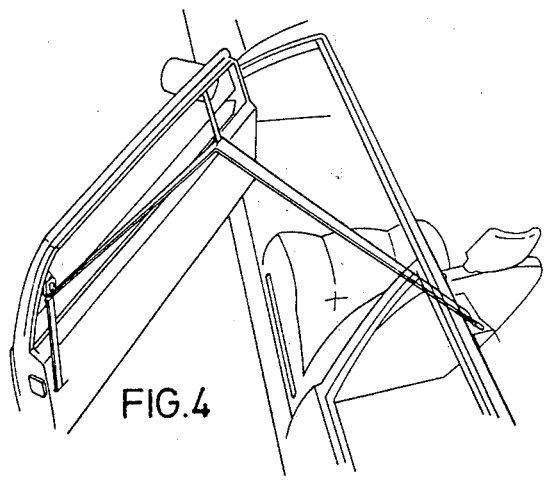
Figure 5:
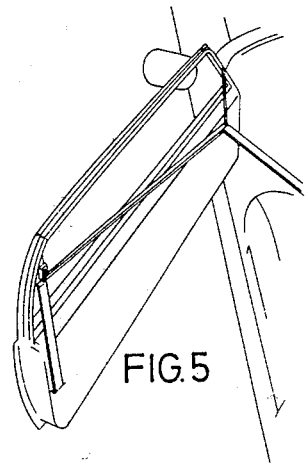
Figure 6:
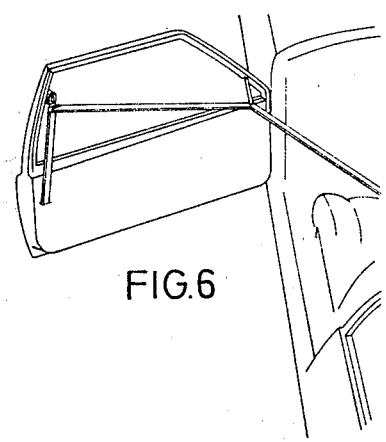

The invention will be described in more detail with reference to an embodiment shown in the accompanying drawings, of which FIG. 1 shows a vehicle seat with the belt system according to the invention, FIG. 2 shows a detailed view of the cursor and track and FIGS. 3-6 show various views illustrating the position of the belt band as the door is opened to various degrees.

The passive belt system shown in the figures comprises a diagonal belt band 1, the lower end of which is provided with a lock tongue 2, which is coupled to a lock 3 on a strap 4 fixed to the floor. The band extends upwards towards the door 5 adjacent to the seat. A redirecting fitting or guide ring 7 is pivotally attached to the rear vertical window frame portion 6 of said door. That fitting is located behind the strap 4. The band extends through a slot 8 in the fitting 7 and through a slot 9 in the door to a reel mechanism 10 which can be of a type known per se.

According to the invention the band 1, in the vicinity of the fitting 7, is joined to a short strap 11. The end of the strap 11 can be sewn onto the band 1 or detachably attached with the aid of a bur fastener for example. The other end of the strap is attached to a cursor 12 which runs in a track 13, which is carried on the upper door window frame portion 14. The track 13 can be an aluminum profile and the cursor 12 a block of plastic material which has very little friction against the track. In the preferred embodiment, the strap 11 consists of an elastic band so that it can be elongated elastically up to a certain limit, after which it is non-elastic, but it can also be entirely non-elastic.

When the door is opened, the catch device of the reel mechanism 10 is first released by a means (not shown) which can be of the type disclosed in the above-mentioned U.S. Pat. No. 4,007,802. When the band 1 runs out from the reel mechanism via the fitting 7, the lower end of the strap 11 is first carried with it as far as the length or elasticity permits. Since the point of attachment to the floor is located forward of the fitting 7 a forwardly directed force component is obtained so that the cursor 12 is forced forward in the track towards the front edge of the door when the opening angle of the door increases. The portion of the band which is rolled off from the reel mechanism is pulled forward by the strap 11, so that the upper end of the diagonal active portion of the band is moved forward along the door. The dash-dotted lines in FIG. 1 show the position with the door half-open. It is already evident here that the belt band has been moved so far out of the way that it does not present any appreciable obstacle to getting in and out of the vehicle.

As the cursor 12 is slid forward in the track 13, there is a successive change in the angle of the strap 11 to the plane of the door. In one embodiment (not shown) the track profile is twisted to compensate for this change of angle and counteract the corresponding successive increase in friction. A track with a slot for the strap 11 which is downwardly directed in the rear portion of the track, is thus twisted so that the slot in the forward portion of the track is turned more towards the interior of the vehicle.

What we claim is:

1. Passive safety belt system for motor vehicles, comprising a belt band, which has an active portion extending diagonally across a vehicle seat from a lower point of attachment at or in the vicinity of the floor of the vehicle via a redirecting fitting which is attached to the rear portion of a window frame of a door adjacent said seat, to a reel mechanism arranged in the door, characterized in that the belt band is joined, in the vicinity of the redirecting fitting, to one end of a strap, the other end of which is provided with a cursor, which is displaceable in a track, which extends along the upper portion of the door window frame, such that, when the opening angle of the door increases, the belt band loads, via the strap, the cursor with a forwardly directed force component, which displaces the cursor towards the front end of the track.

2. Belt system according to claim 1, characterized in that the strap is elastically extendable in its longitudinal direction up to a certain limit, whereafter it is non-elastic.

3. Belt system according to claim 1 or 2, characterized in that the strap is detachably joined to the belt band.

4. Belt system according to any one of claims 1-3, characterized in that the track is formed of a metal rail which extends along an upper horizontal and a forward inclined portion of the door window frame, the cursor consisting of a slide member displaceable in the rail and made of a material, for example a plastics material, which has low friction against the rail.

* * * * *